(12) United States Patent
Harley

(10) Patent No.: US 7,186,041 B2
(45) Date of Patent: Mar. 6, 2007

(54) KEYBOARD LAYOUT FOR MOUSE OR ROCKER SWITCH TEXT ENTRY

(75) Inventor: Jonah A. Harley, Mountain View, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 11/101,936

(22) Filed: Apr. 8, 2005

(65) Prior Publication Data

US 2006/0228149 A1    Oct. 12, 2006

(51) Int. Cl.
*B41J 5/00* (2006.01)
(52) U.S. Cl. ............................... 400/486; 400/489
(58) Field of Classification Search ......... 400/486–489
See application file for complete search history.

(56) References Cited

U.S. PATENT DOCUMENTS

| | | | |
|---|---|---|---|
| 4,927,279 A * | 5/1990 | Morgan | 400/486 |
| 5,487,616 A | 1/1996 | Ichbiah | |
| 5,963,671 A | 10/1999 | Comerford et al. | |
| 6,573,844 B1 | 6/2003 | Venolia et al. | |
| 6,657,560 B1 * | 12/2003 | Jung | 341/22 |
| 6,724,370 B2 * | 4/2004 | Dutta et al. | 345/169 |
| 6,851,877 B1 | 2/2005 | Liebhold | |

* cited by examiner

*Primary Examiner*—Judy Nguyen
*Assistant Examiner*—N. Ha

(57) ABSTRACT

A soft keyboard includes at least three rows of keys wherein a middle row is located near the center of the keyboard. The middle row includes vowel keys, and an upper row and a lower row include consonant keys. The consonant keys and the vowels keys are arranged in alphabetical order. At least one of the three rows of keys further includes at least one of the space key, the enter key, and the delete key.

Another soft keyboard includes a first ring of keys around a central key, and a second ring of keys around the first ring of keys. The central key may be the enter key. The first ring of keys includes vowel keys arranged in alphabetical order. The first ring of keys may include the space key and the delete key. The second ring of keys includes consonant keys arranged in alphabetical order.

12 Claims, 5 Drawing Sheets

KEYBOARD LAYOUT FOR MOUSE OR ROCKER SWITCH TEXT ENTRY

DESCRIPTION OF RELATED ART

A soft keyboard is a system that replaces the hardware keyboard on a computing device with an on-screen image map. With a soft keyboard, the user enters data by selecting one key after another on the keyboard display (hereafter referred to as "single-key entry"). Usually the user selects the keys with a stylus or with a cursor/highlight controlled by an input device (e.g., a mouse, a rocker switch, a track pad, a joystick, or a track ball).

For soft keyboards, the time to select a key is a strong function of the distance the cursor must move to reach that key. The other major factor in typing speed with such a system is how much time the user spends searching for a given key. Familiarity with the keyboard layout is therefore also of primary concern.

Thus, what is needed is a keyboard layout that improves the speed of selection using single-key entry.

SUMMARY

In one embodiment, a soft keyboard includes at least three rows of keys wherein a middle row is located near the center of the keyboard. The middle row includes vowel keys, and an upper row and a lower row include consonant keys. The consonant keys and the vowels keys are arranged in alphabetical order. At least one of the three rows of keys further includes at least one of the space key, the enter key, and the delete key.

In another embodiment, a soft keyboard includes a first ring of keys around a central key, and a second ring of keys around the first ring of keys. The central key may be the enter key. The first ring of keys includes vowel keys arranged in alphabetical order. The first ring of keys may include the space key and the delete key. The second ring of keys includes consonant keys arranged in alphabetical order.

BRIEF DESCRIPTION OF THE DRAWINGS

Use of the same reference numbers in different figures indicates similar or identical elements.

DETAILED DESCRIPTION

Figure 1:
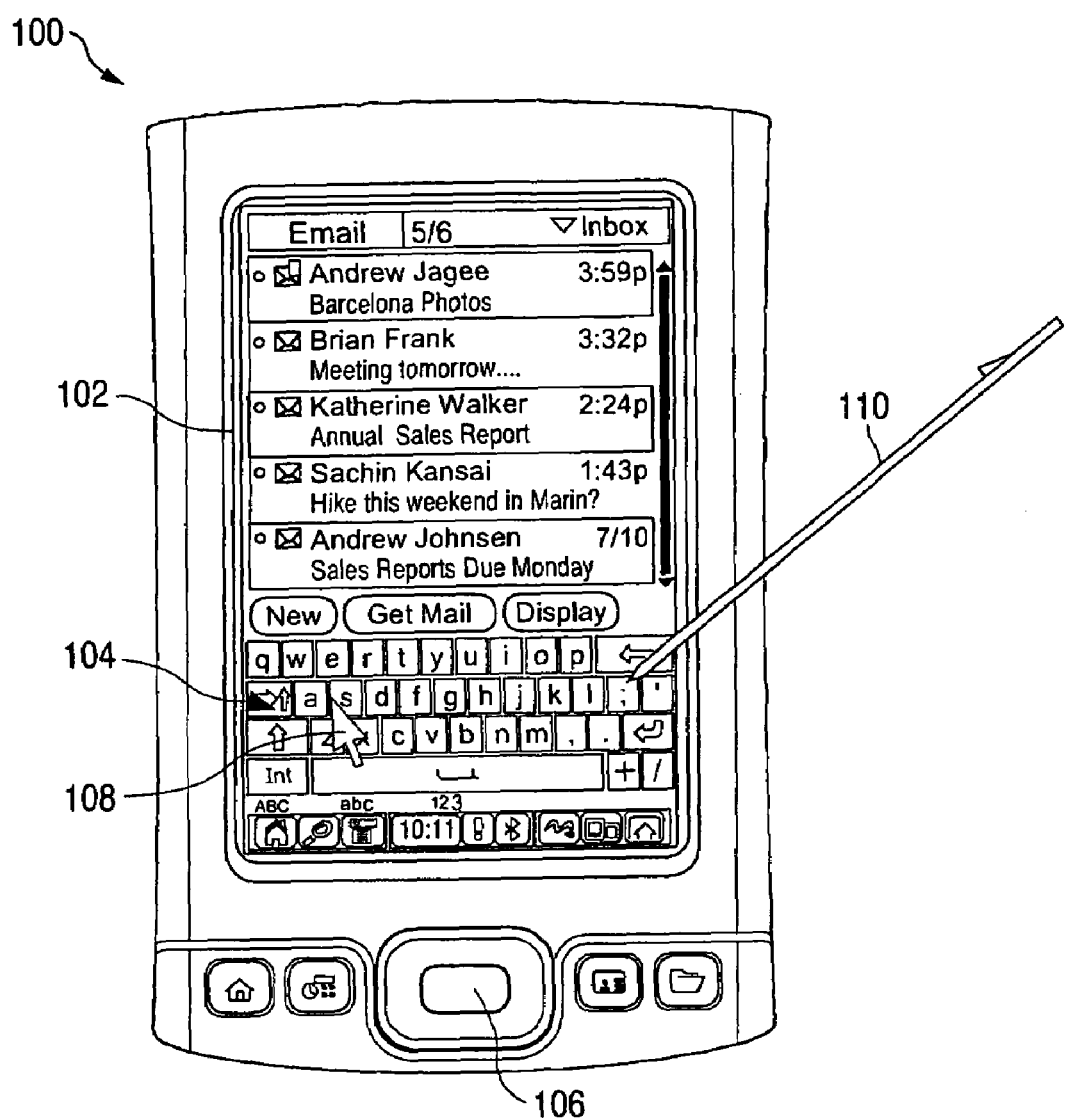
FIG. 1 illustrates a personal digital assistant.

FIG. 1 illustrates a handheld computing device 100, such as a personal digital assistant (PDA). PDA 100 includes a screen 102 displaying a soft keyboard 104. Soft keyboard 104 employs the standard QWERTY layout. A user may enter data by using input device 106 to move a cursor 108 and select characters from soft keyboard 104. Alternatively, the user may enter data by tapping characters on soft keyboard 104 using a stylus 110.

In an ideal keyboard layout, the most common characters should be grouped together at the center of the keyboard. In addition, the most common digraphs (i.e., character pairs) should be grouped together as much as possible. However, the ideal keyboard layout is not often used due to the difficulty of learning a new keyboard layout. The standard QWERTY layout is well known but the inefficiency of the layout makes it too slow for single-key entry. The QWERTY layout also has a rectangular aspect ratio that does not lend itself to other configurations more suitable for the small display of handheld computing devices.

Figure 2:
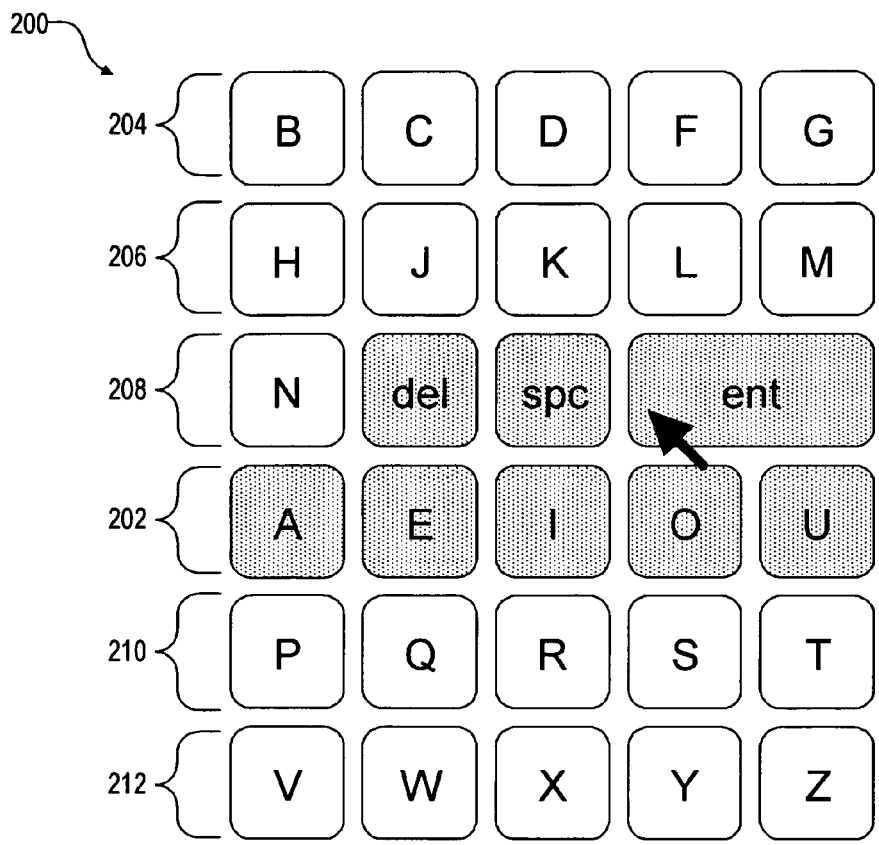
FIGS. 2, 3, 4, 5, and 6 illustrate layout of soft keyboards in embodiments of the invention.

FIG. 2 illustrates a layout of a soft keyboard 200 in one embodiment of the invention. Soft keyboard 200 includes a row 202 of vowel keys arranged in alphabetical order. Row 202 includes vowel keys A, E, I, O, and U. Above row 202 are rows 204, 206, and 208 of consonant keys arranged in alphabetical order. Row 204 includes the consonant keys from B to G, row 206 includes the consonant keys from H to M, and row 208 includes the consonant key N. Row 208 further includes common special keys, such as the delete key, the space bar, and the enter key. The vowels keys and the common special keys may be shaded to distinguish them from the consonant keys. Rows 202 and 208 are located near or at the vertical center of soft keyboard 200 so these common keys are easily accessible to the user. Below row 202 are rows 210 and 212 of consonant keys arranged in alphabetical order. Row 210 includes the consonant keys from P to T, and row 212 includes the consonant keys from V to Z.

Soft keyboard 200 is easy for a user to learn because the consonant keys are maintained in alphabetic order but with a special row of vowels in the center of the keyboard. Soft keyboard 200 offers fast data entry because the common keys, such as the vowel keys, the delete key, the space bar, and the enter key, are centrally located. Soft keyboard 200 can be changed to various aspect ratios following the principles described above to suit various applications.

Figure 3:
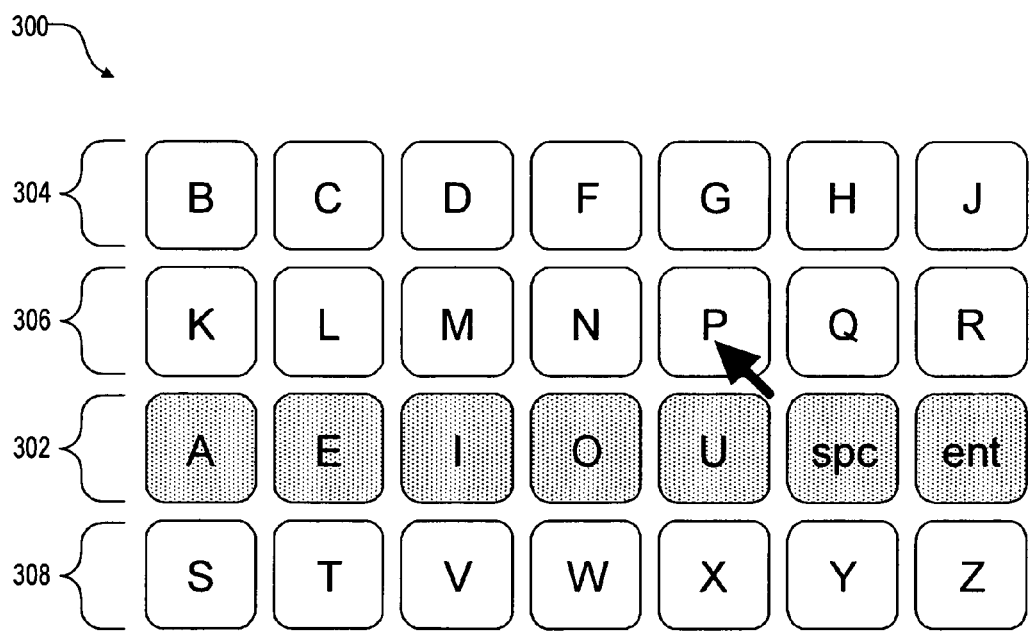

FIG. 3 illustrates a soft keyboard 300 in one embodiment of the invention. Soft keyboard 300 is a variation of soft keyboard 200 with a wider but shorter aspect ratio. Soft keyboard 300 includes a row 302 of vowel keys arranged in alphabetical order. Row 302 includes vowel keys A, E, I, O, and U. Row 302 further includes common special keys, such as the space bar and the enter key. The vowels keys and the common special keys may be shaded to distinguish them from the consonant keys. Row 302 is located near or at the vertical center of soft keyboard 300 so these common keys are easily accessible to the user. Above row 302 are rows 304 and 306 of consonant keys arranged in alphabetical order. Row 304 includes the consonant keys from B to J, and row 306 includes the consonant keys from K to R. Below row 302 is a row 308 of consonant keys arranged in alphabetical order. Row 308 includes the consonant keys from S to Z.

Figure 4:
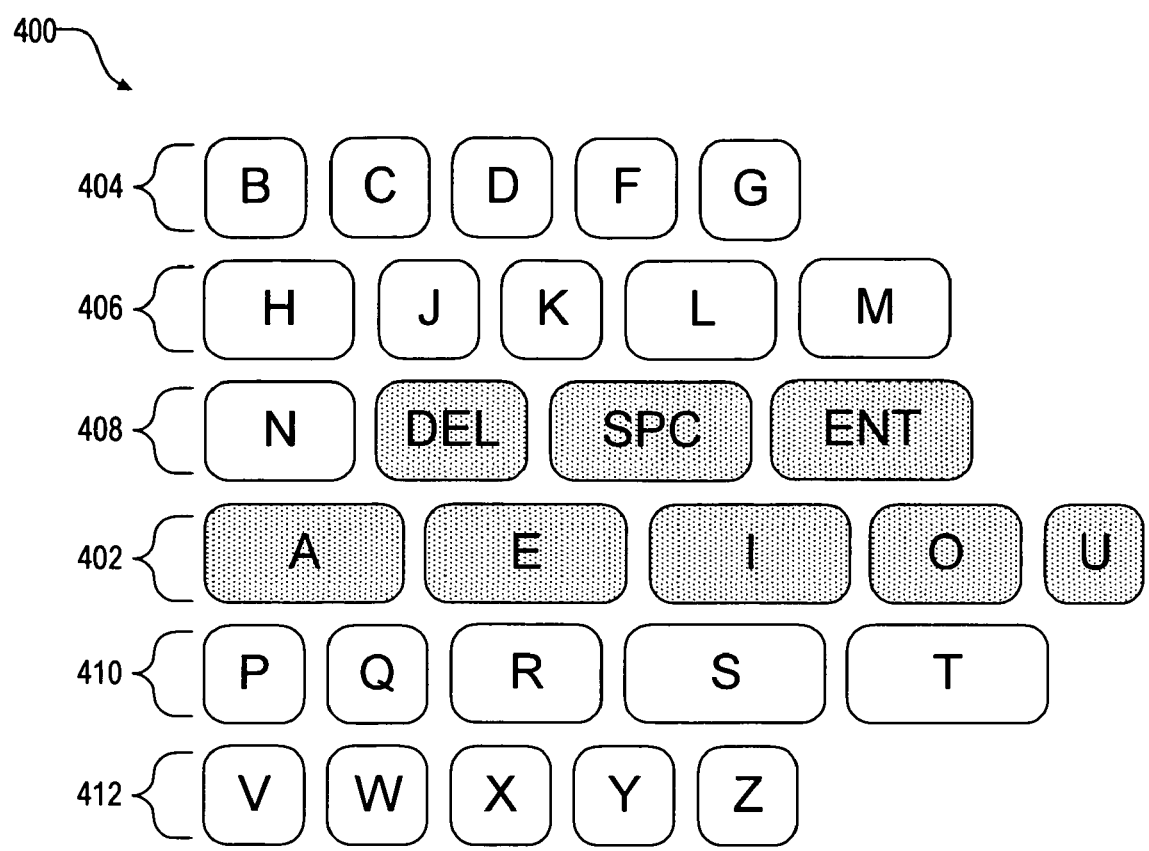

FIG. 4 illustrates a soft keyboard 400 in one embodiment of the invention. Soft keyboard 400 is a variation of soft keyboard 200 with keys that vary in size. In one embodiment, the keys are divided into three sizes according to their usage frequencies in a particular language (e.g., English), in a particular application, or by a particular user. For example, the A key is a large key, the O key is a medium key, and U is a small key. In another embodiment, the keys adaptively enlarge to emphasize what the user is likely to select next based on what the user has selected previously.

Soft keyboard 400 includes a row 402 of vowel keys, row 404, 406, and 408 of consonant keys above row 402, and rows 410 and 412 of consonant keys below row 402. The vowel and consonant keys are arranged in alphabetical order. Row 408 further includes common special keys, such as the delete key, the space bar, and the enter key.

Figure 5:
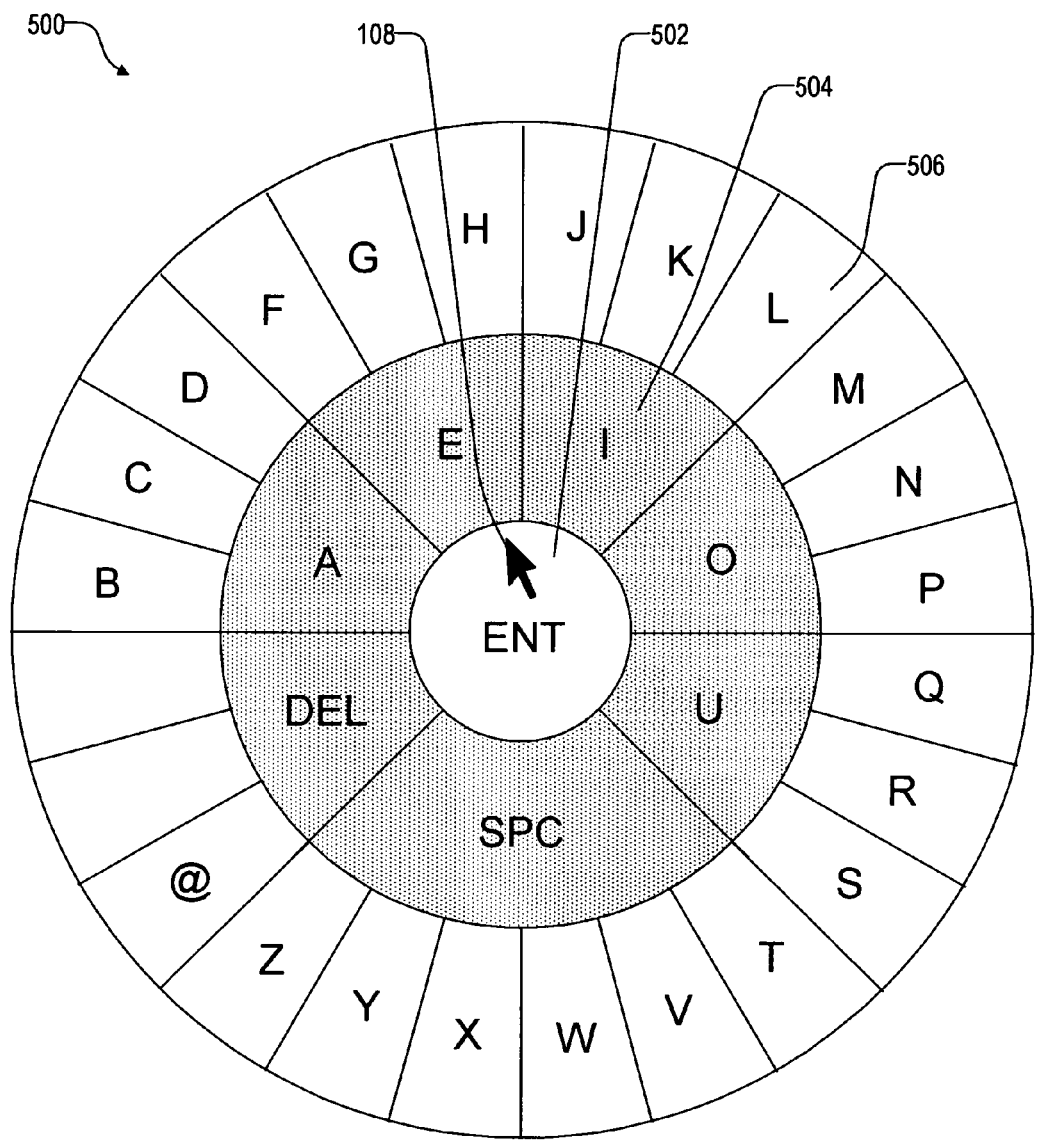

FIG. 5 illustrates a soft keyboard 500 in one embodiment of the invention. Soft keyboard 500 follows the principles of soft keyboard 200 but is arranged in a circular manner. Soft keyboard 500 includes a center key 502, a first ring 504 of vowel keys arranged around center key 502, and a second ring 506 of consonant keys arranged around first ring 504. Center key 502 is a common special key, such as the enter key. First ring 504 includes vowel keys A, E, I, O, and U. First ring 504 further includes common special keys, such as the delete key and the space bar. Second ring 506 includes consonant keys B to Z. Second ring 506 further includes common punctuation keys, such as the comma key, the period key, and the ampersand key.

Soft keyboard 500 is well suited for a device 100 that re-centers cursor 108 (or highlight) over center key 502 after the selection of a key. The re-centering of cursor 108 can be accomplished either by software or by hardware. For example, the software that generates soft keyboard 500 can be programmed to re-center cursor 108 over center key 502 after the selection of a key. Alternatively, input device 106 (FIG. 1) can be made so it mechanically returns to a neutral position that re-centers cursor 108 over center key 502.

Figure 6:
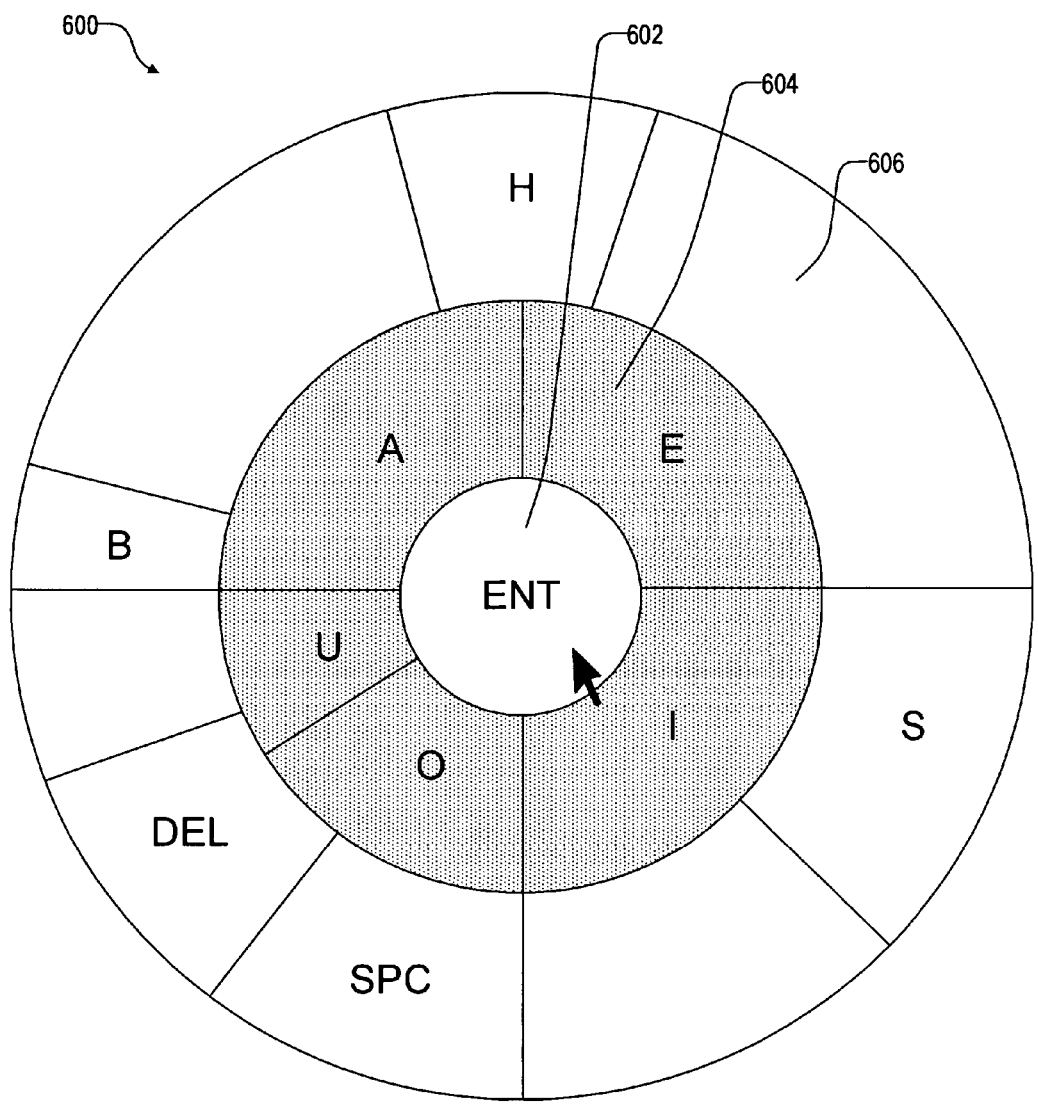

FIG. 6 illustrates a soft keyboard 600 in one embodiment of the invention. Soft keyboard 600 is a variation of soft keyboard 500 with keys that vary in size. For clarity, only some of the keys are shown. In one embodiment, the keys are divided into three sizes according to their usage frequencies in a particular language (e.g., English), in a particular application, or by a particular user. For example, the B key is a small key, the H key is a medium key, and the S key is a large key. In another embodiment, the keys adaptively enlarge to emphasize what the user is likely to select next based on what the user has selected previously.

Soft keyboard 600 includes a common special key 602, a first ring 604 of vowel keys around key 602, and a second ring 606 of consonant keys around first ring 604. The vowel and consonant keys are arranged in alphabetical order. Second ring 606 further includes common special keys, such as the enter key, the space bar, and the delete key.

Various other adaptations and combinations of features of the embodiments disclosed are within the scope of the invention. For example, when a shift key is selected, the letters in the soft keyboard can become capitalized. When another key is selected, the layout can change from the letter keys to number or punctuation keys. Even though the keys have changed, the principle of the invention still applies in that number and punctuation keys are placed in a familiar order with the most common keys near the center if possible. Numerous embodiments are encompassed by the following claims.

What is claimed is:

1. A soft keyboard, comprising:
   an upper row of keys,
   a middle row of keys comprising vowel keys arranged in alphabetical order, the middle row being located approximately at the center of the soft keyboard; and
   a lower row of keys, the upper and the lower rows comprising consonant keys arranged in alphabetical order;
   wherein the vowel keys comprise multiple sizes depending on their usage frequencies, and the consonant keys comprise multiple sizes depending on their usage frequencies.

2. The keyboard of claim 1, wherein at least one of the upper, the middle, and the lower rows further comprises at least one special key.

3. The keyboard of claim 2, wherein the special key is selected from the group consisting of a delete key, a space bar key, and an enter key.

4. A method for generating a soft keyboard, comprising:
   displaying an upper row of keys;
   displaying a middle row of keys comprising vowel keys arranged in alphabetical order, the middle row being located approximately at the center of the soft keyboard; and
   displaying a lower row at keys, the upper and the lower rows comprising consonant keys arranged in alphabetical order;
   wherein the vowel keys comprise multiple sizes depending on their usage frequencies, and the consonant keys comprise multiple sizes depending on their usage frequencies.

5. The merited of claim 4, wherein at least one of the upper, the middle, and the lower rows further comprises at least one special key.

6. The method of claim 5, wherein the special key is selected from the group consisting of a delete key, a space bar key, and an enter key.

7. A soft keyboard, comprising:
   a first ring of keys comprising vowel keys, wherein all the vowel keys are arranged consecutively in alphabetical order; and
   a second ring of keys arranged around the first ring, the second ring of keys comprising consonant keys arranged in alphabetical order, the consonant keys comprising all consonants in an alphabet; wherein the keys in the first ring comprise multiple sizes depending on their usage frequencies, and the keys in the second ring comprise multiple sizes depending on their usage frequencies.

8. The keyboard of claim 7, further comprising at least one key located within the first ring.

9. The keyboard of claim 8, wherein the key within the first ring and at least one additional key in the first ring comprise special keys, the special keys are selected from the group consisting of a delete key, a space bar key, and an enter key.

10. A method for generating a soft keyboard, comprising:
    displaying a first ring of keys comprising vowel keys, wherein all the vowel keys are arranged consecutively in alphabetical order; and
    displaying a second ring of keys arranged around the first ring, the second ring of keys comprising consonant keys arranged in alphabetical order, the consonant keys comprising all consonants in an alphabet; wherein the keys in the first ring comprise multiple sizes depending on their usage frequencies, and the keys in the second ring comprise multiple sizes depending on their usage frequencies.

11. The method of claim 10, further comprising displaying at least one key located within the first ring.

12. The method of claim 11, wherein the key within the first ring and at least one additional key in the first ring comprise special keys, the special keys are selected from the group consisting of a delete key, a space bar key, and an enter key.

* * * * *

UNITED STATES PATENT AND TRADEMARK OFFICE
CERTIFICATE OF CORRECTION

| | | |
|---|---|---|
| PATENT NO. | : 7,186,041 B2 | |
| APPLICATION NO. | : 11/101936 | |
| DATED | : March 6, 2007 | |
| INVENTOR(S) | : Jonah Harley | |

It is certified that error appears in the above-identified patent and that said Letters Patent is hereby corrected as shown below:

(Column 3 Line 46) In Claim 1, after "keys" delete "," and insert -- ; --, therefor.

(Column 4 Line 7)(Approx.) In Claim 4, before "keys," delete "at" and insert -- of --, therefor.

(Column 4 Line 14)(Approx.) In Claim 5, delete "merited" and insert -- method --, therefor.

Signed and Sealed this

Ninth Day of December, 2008

JON W. DUDAS
*Director of the United States Patent and Trademark Office*